United States Patent [19]

Bernot et al.

[11] Patent Number: 4,840,460
[45] Date of Patent: Jun. 20, 1989

[54] APPARATUS AND METHOD FOR PROVIDING A GRAY SCALE CAPABILITY IN A LIQUID CRYSTAL DISPLAY UNIT

[75] Inventors: Anthony J. Bernot, Gilbert; Michael J. Johnson, Phoenix, both of Ariz.

[73] Assignee: Honeywell Inc., Minneapolis, Minn.

[21] Appl. No.: 120,456

[22] Filed: Nov. 13, 1987

[51] Int. Cl.⁴ .................................................. G02F 1/13
[52] U.S. Cl. .................................. 350/333; 350/339 R
[58] Field of Search .......................... 350/333, 339 R

[56] References Cited

U.S. PATENT DOCUMENTS

3,647,958 3/1972 Sobel .................................... 350/333
4,712,877 12/1987 Okada et al. ........................ 350/334

Primary Examiner—Stanley D. Miller
Assistant Examiner—Anita E. Pellman
Attorney, Agent, or Firm—William W. Holloway; Joseph S. Failla; John G. Shudy

[57] ABSTRACT

A liquid crystal display is described that includes gray scale capability. Each pixel of the display is subdivided into a plurality of subpixels. Each subpixel includes an effective capacitor, with the liquid crystal material contained between the effective capacitor plates, and includes a control capacitor coupled in series with the effective capacitor. By controlling the capacitance of the control capacitors of the subpixels, selected subpixels can be activated as a function of the voltage applied across the series capacitors. By controlling the number of subpixels that are activated by the applied voltage, a gray scale capability can be provided for a liquid crystal display.

20 Claims, 8 Drawing Sheets

FIG. 5C. PRIOR ART — FIELD 50% ON

FIG. 5B. PRIOR ART — FIELD ON LIGHT PASSES

FIG. 5A. PRIOR ART — FIELD OFF LIGHT BLOCKED

GRAY SCALE LEVEL No. 6
 GRAY SCALE LEVEL No. 1
 GRAY SCALE LEVEL No. 7
 GRAY SCALE LEVEL No. 2
 GRAY SCALE LEVEL No. 8
 GRAY SCALE LEVEL No. 3
 GRAY SCALE LEVEL No. 9
 GRAY SCALE LEVEL No. 4
 GRAY SCALE LEVEL No. 10
 GRAY SCALE LEVEL No. 5

$$C = K\left(\frac{E_o A}{d}\right)$$

FIG. 8A.

$$C = A\left(\frac{K E_o}{d}\right)$$

FIG. 8B.

$$C = \frac{1}{d}(K E_o A)$$

APPARATUS AND METHOD FOR PROVIDING A GRAY SCALE CAPABILITY IN A LIQUID CRYSTAL DISPLAY UNIT

RELATED APPLICATION

The following U.S. Patent Application is related to the present invention: APPARATUS AND METHOD FOR PROVIDING A GRAY SCALE IN LIQUID CRYSTAL FLAT PANEL DISPLAYS, invented by Kalluri R. Sarma, having Ser. No. 07/120,553, filed on Nov. 13, 1987 and assigned to the assignee of the present application.

BACKGROUND OF THE INVENTION

1. Field of the Invention

This invention relates generally to devices for visually displaying data and images and, more particularly to liquid crystal displays.

2. Description of the Related Art

Centain materials, generally referred to as liquid crystals, are electro-optic in that an application of a voltage of appropriate magnitude changes the optical properties of light transmitted through the liquid crystal media. This change in the optical properties of light transmitted through the liquid crystal media has received increasing use as the basis for optical displays. This electro-optic behavior is particularly well suited to active matrix displays where a high impedance solid state switch (such as a thin film transistor or diode) is used to transfer voltage to the liquid crystal capacitor at each pixel of the matrix display. In addition, the liquid crystal display units have a low power requirement, the power being used only to deform the initial orientation of the liquid crystal molecules. Liquid crystal display units can operate in ambient light when a mirror is placed behind the liquid crystal material and the optical properties of the material are used to control the reflected light. The use of ambient light typically requires that the liquid crystal display unit be oriented carefully with respect to the light source. To reduce the orientation problem and to alleviate the requirement for an ambient light, the liquid crystal display panel can be illuminated from the rear. Finally, the liquid crystal display panel can be fabricated to be flat and relatively narrow. With modern technology, the associated circuits can be made to occupy relatively little space within any desired configuration.

Figure 1A:
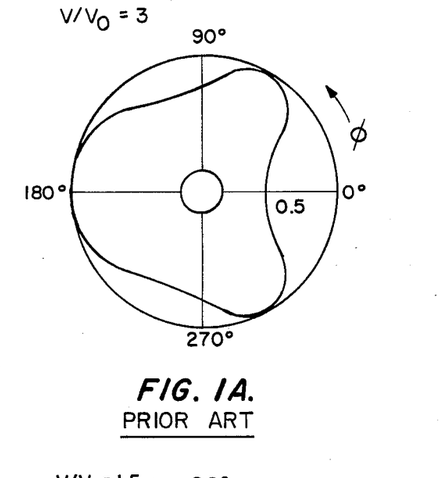
FIG. 1 illlustrates the angular dependence of the optical transmission for a twisted nematic liquid crystal material.
Figure 1B:
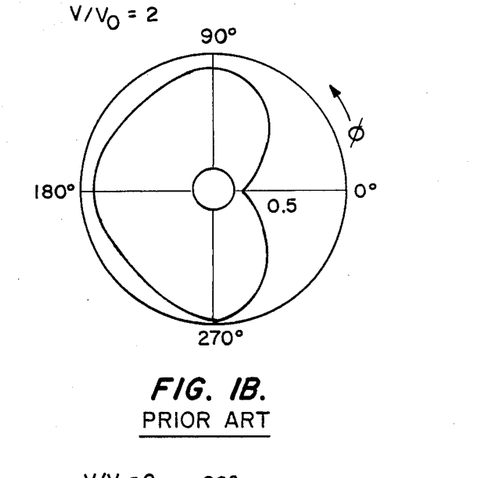
Figure 1C:
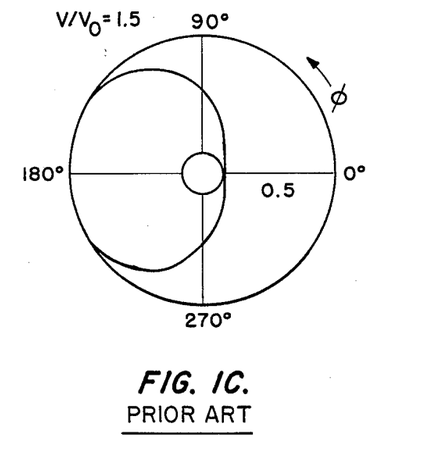
Figure 1D:
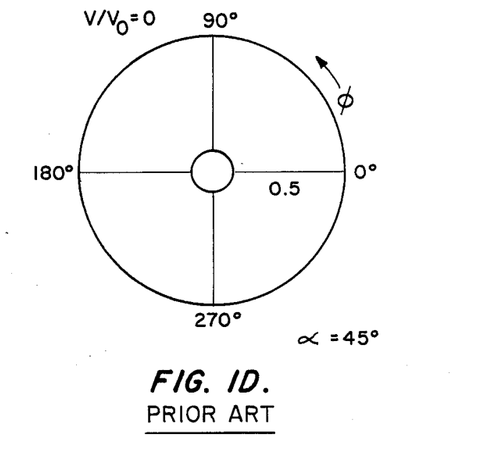
Figure 1E:
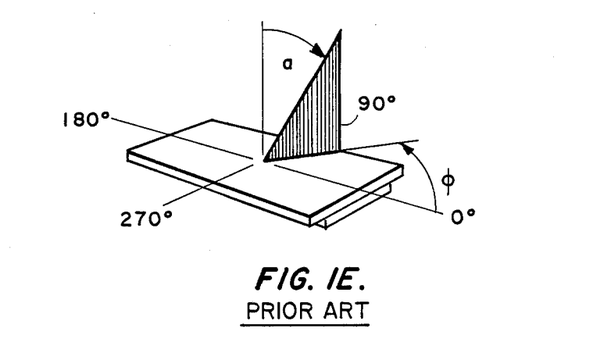

However, until the present time, the liquid crystal displays have suffered from the inability to incorporate a satisfactory gray scale capabiltiy in the unit. In the past, attempts to achieve a gray scale capability in liquid crystal displays have used the direct approach of dividing each display point, hereinafter referred to as pixel, into a plurality of subunits or subpixels. The number of subunits which are activated provides the gray scale gradations. This approach has proven unsatisfactory for two reasons. For any significant number of pixel subunits, the density of address lines is greatly increased, resulting in difficulties in the panel fabrication. The addressing the subpixel array becomes more difficult because a plurality of subpixels may need to be activated simultaneously for each pixel. Another technique that has been employed in order to achieve a gray scale capability is partially deforming the molecular orientation of the liquid crystal material by applying a voltage to the pixel that is greater than the threshold voltage, but less than the voltage for optical saturation an effort to achieve controllable optical transmission properties. For a twisted nematic liquid crystal display, a voltage level greater than threshold voltage level produces partial deformation of the liquid crystal molecular alignment. However, the partial deformation results in a gray scale which is a function of the viewing angle about an axis perpendicular to the liquid crystal display and, for this reason, has not proven satisfactory. Referring now to FIG. 1, the angular dependence of the transmission of light through a twisted nematic liquid crystal for several applied voltages is illustrated. The applied voltage is stated in terms of the ratio of the applied voltage V to the threshold voltage $V_0$ for $V/V_0=3$ (FIG. 1A), $V/V_0$ 2 (FIG. 1B), $V/V_0=1.5$ (FIG. 1C) and $V/V_0=0$ (FIG. 1D). The angle of viewing (i.e., departure from the axis of the display unit) is 45° and the angle is the angle around the axis (the angles being illustrated in FIG. 1E). The magnitude of light transmission is given by the distance from the center (axis) of the Figure. As will be apparent, any attempt to use the applied voltage in a cell containing a twisted nematic liquid crystal to provide controllable changes in the optical transmission will be unsatisfactory because of the angular dependence of the optical transmission.

A need has therefore been felt for a technique that would provide a gray scale capability for a liquid crystal diplay unit without the angular dependence associated with prior art liquid crystal display unit gray scale techniques.

FEATURES OF THE INVENTION

It is an object of the present invention to provide an improved display unit.

It is a feature of the present invention to provide an improved liquid crystal diplay unit.

It is yet another feature of the present invention to provide a liquid crystal display unit having a gray sale capability.

It is still another feature of the present invention to provide a liquid crystal display unit in which each of the pixels include a plurality of subpixels It is a further feature of the present invention to provide a liquid crystal display in which the magnitude of a voltage applied to a pixel control the number of subpixels activated.

It is still a further feature of the present invention to provide a liquid crystal display unit to provide a gray scale that is independent of viewing angle.

It is yet a further feature of the present invention to provide a liquid crystal display unit that has improved gray scale characteristics in response to analog input signals.

It is still a further feature of the present invention to provide gray scale capability for a liquid crystal display unit without additional address lines and/or additional active elements.

SUMMARY OF THE INVENTION

The aforementioned and other features are accomplished, according to the present invention, by providing a plurality of subpixels associated with each pixel of the display. A control capacitor is placed in series with an effective capacitor, the effective capacitor having liquid crystal material between the plates, for each subpixel and provides a voltage dividing network for controlling the voltage across the effective liquid crystal capacitor. The values of the control capacitors are selected to permit the number of subpixels achieving optical saturation to be determined by the voltage applied to the pixel. Techniques for controlling the parameters of the control capacitors for the subpixels are discussed. The use of the voltage controlled subpixels provides the liquid crystal display with gray scale capabilities. Because the liquid crystal associated with each subpixel is either unaffected by the applied voltage or else is saturated, the angular homogeneity of the transmitted radiation is greatly improved. The angular homogeneity of the transmitted radiation of analog signals is also improved.

These and other features of the present invention will be understood upon reading of the following description along with the drawings.

DESCRIPTION OF THE PREFERRED ENBODIMENT

1. Detailed Description of the Figures

FIG. 1 has been discussed with reference to the related art.

Figure 2:
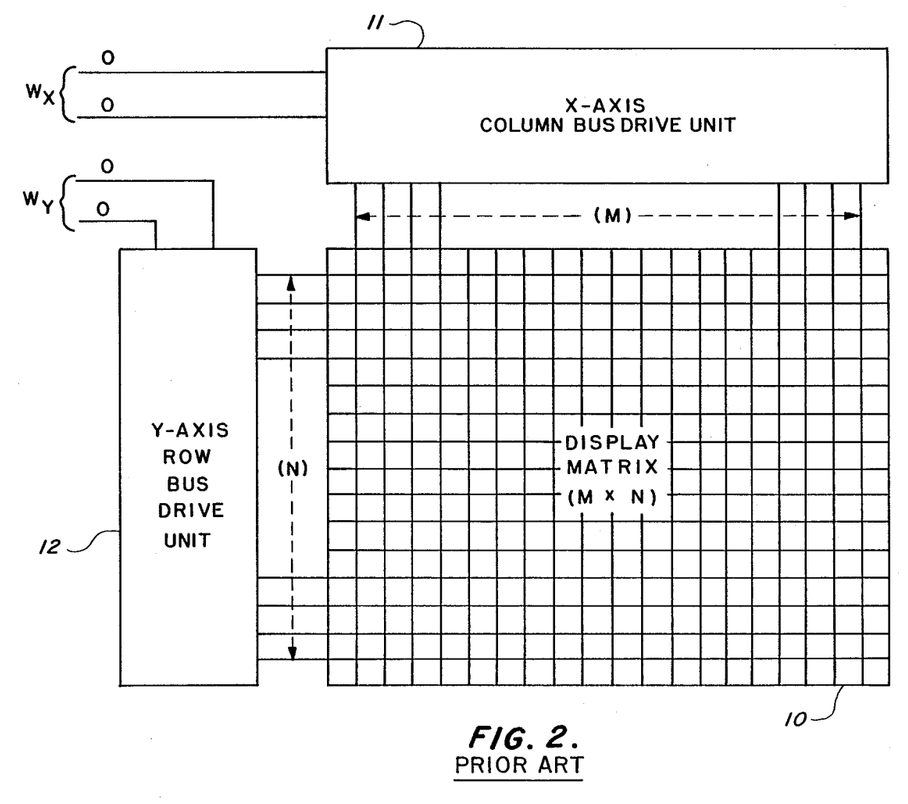
FIG. 2 is block diagram illustrating the liquid crystal matrix display.

Referring next to FIG. 2, the block diagram of the liquid crystal display matrix is shown. The liquid crystal display 10 has a multiplicity (MxN) of pixels, each pixel being addressed by one of M column conductors and one of N row conductors. The M column conductors are selected by x-axis column bus drive until 11 in response to groups of address signals, $W_x$, and the N row conductors are selected by y- row bus drive unit 12. The intersection of an activated column conductor and an activated row conductor activates the associated pixel.

Figure 3A:
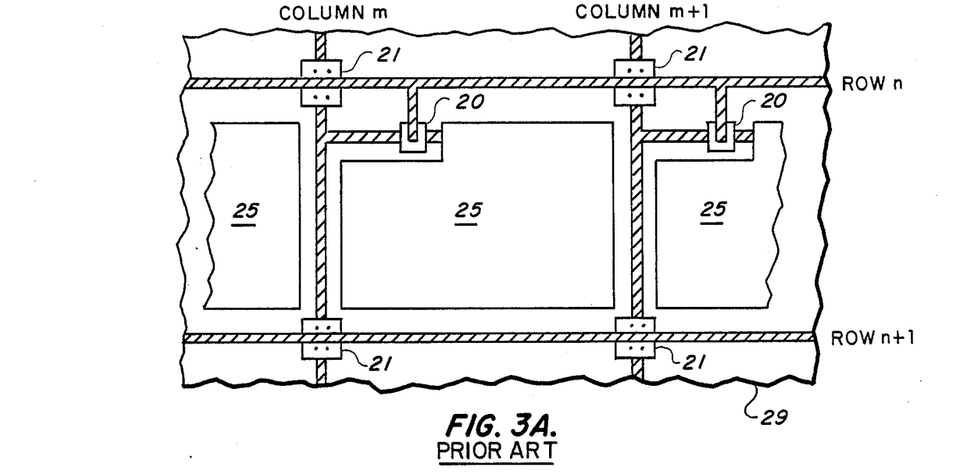
FIG. 3A illustrates the electrical coupling of the column and row conductors to the pixel element and FIG. 3B illustrates the equivalent circuit for the electrical coupling.
Figure 3B:
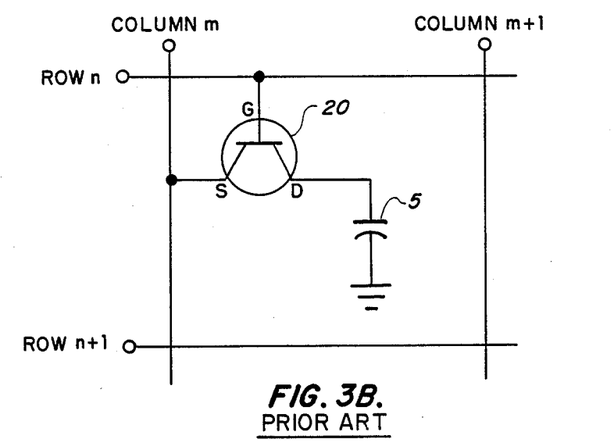

Referring next to FIG. 3A, the coupling of the column and row conductors to the pixel is illustrated. The row and column conductors are deposited on a substrate 29 that forms one surface of the container for the liquid crystal material. The row conductors and the column conductors are separated (electrically) by insulatinng material pads 21. Fabricated in close proximity to the intersection of a column conductor (m) and a row conductor (n) is thin film transistor 20. The thin film transistor 20 has source terminal coupled to the column conductor (m) and a gate terminal coupled to row conductor (n). The thin film transistor 20 has a drain terminal coupled to conducting material 25 located on the interior surface of the substrate 29 (fabricated from glass in the preferred embodiment). The electric field applied to the liquid crystal pixel (m, n) is the result of the potential difference between the voltage applied to conducting material 25 and the voltage of the common terminal fabricated on the second substrate 32 (shown in FIG. 4) containing the liquid crystal material. The substrate 32, in the preferred embodiment, is a glass material with the common terminal deposited on the interior surface. The equivalent electrical circuit for the pixel is shown in FIG. 3B. The thin film transistor 20 has the source terminal coupled to the column conductor (m) and has the gate terminal coupled to the row terminal (n). The drain terminal of transistor 20 is coupled to capacitance 5. Capacitance 5 is formed by the conducting material 25, the liquid crystal acting as a dielectric material, and the ground terminal on the second plate of the liquid crystal display.

Figure 4:
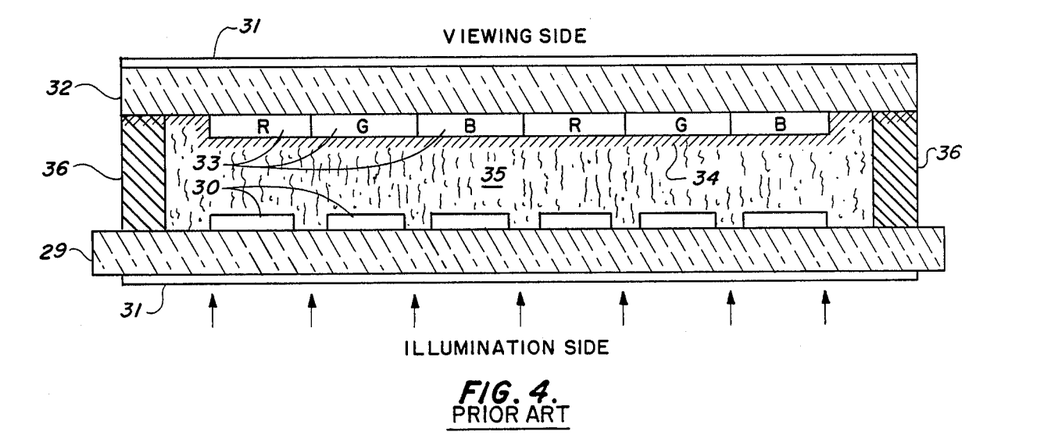
FIG. 4 is a matrix color liquid crystal display capable of using the present invention.

Referring next to FIG. 4, a color liquid crystal display is shown. Glass substrate 29 has a polarizer 31 associated with the exterior surface of substrate 29 while the interior surface of substrate 29 has electrodes 30 (i.e. the thin film transistors 20 and the conducting material 25 of FIG. 3 as well as the column and row conductors) deposited thereon. The second substrate 32 has a polarizer 31 associated with an exterior surface and has color filters associated with the interior surface. A conducting material 34, which serves as the common electrode, is positioned on the interior of glass substrate 32 and the filters 33 are positioned on the conducting material 34. Liquid crystal 35 is placed between the first and second substrate and associated materials, while spacers 36 maintaine the inter-substrate distance and contain the liquid crystal .

Figure 5A:
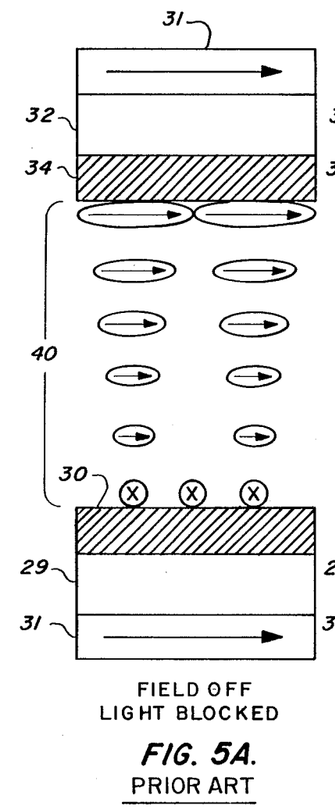
FIG. 5 illustrates a conceptual explanation of the operation of the color liquid crystal matrix display of FIG. 4.
Figure 5B:
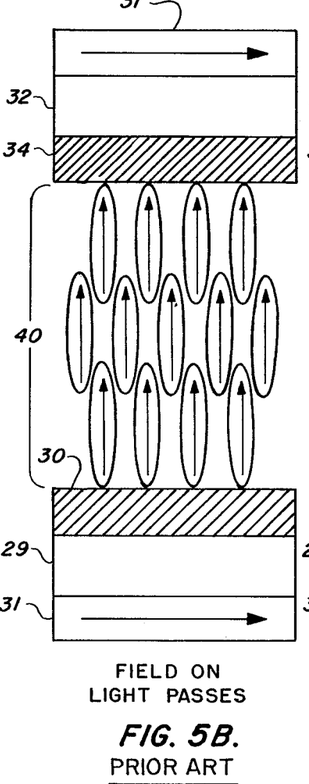
Figure 5C:
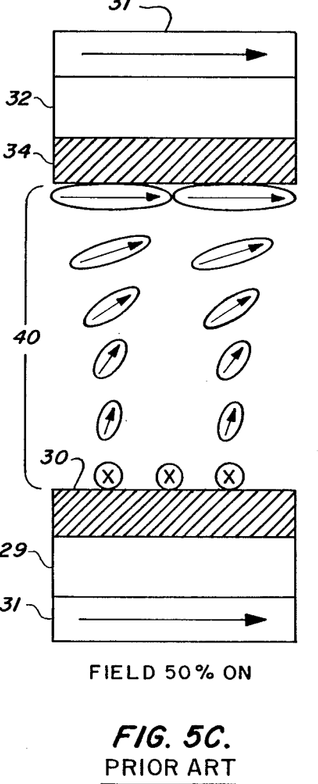

Referring next to FIG. 5, the mode of operation of the liquid crystal display of FIG. 4, using a twisted nematic liquid crystal display, for controlling light transmitted through the display, is shown. In the twisted nematic liquid crystal, the molecules 40 are generally oblong in structure. In FIG. 5A, when the polarizers 31, associated with substrate 32 and 29 respectively, are aligned and no voltage is applied between the electrodes 30 and 34, the molecules of the twisted nematic are generally oriented, along the long axis, parallel to the constraining surfaces. However, the molecules are slightlly rotated relative to the nearest neighbors along an axis perpendicular to the constraining surfaces. In this molecular configuration, light polarized by the light polarizer 31 associated with substrate 31 and traveling along the axis perpendicular to the two constraining surfaces will not be transmitted by the polarizer 31 associated with substrate 32. In FIG. 5B, when a sufficiently large voltage is applied between electrodes 34 and 30, the molecules 40 are aligned with the electric field and light can be transmitted through the display. In FIG. 5C, for intermediate fields, the molecules 40 retain the rotational aspects found in the material when no field is applied, partial alignment with the electric field occurs for molecules in the interior of the display. However, as illustrated in FIG. 1, for intermediate fields, the transmitted light is not axially symmetric.

Figure 6:
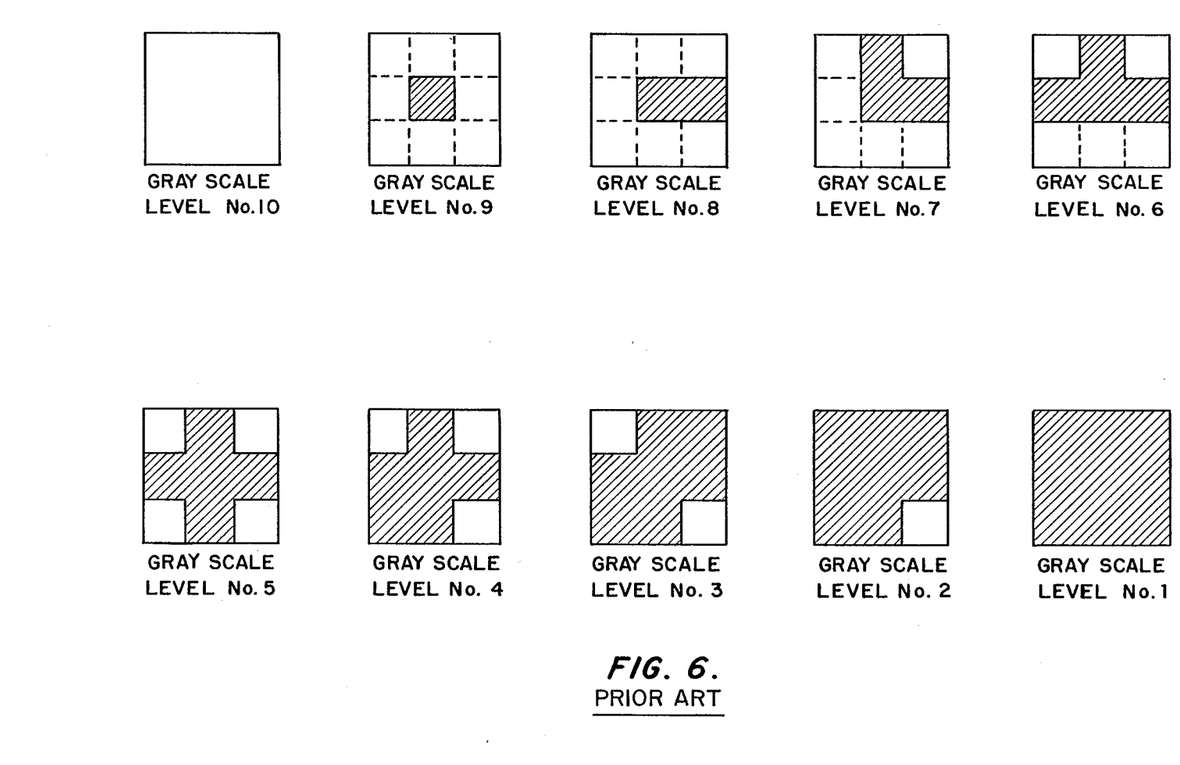
FIG. 6 illustrates how gray scale levels can be achieved by half tone techniques.

Referring next to FIG. 6, the technique for achieving a 10 step gray scale by selectively activating regions of a 3 ×3 pixel matrix is shown. This technique is known as the half-tone technique and relies on the integration by the eye when a pixel is sufficiently distant and/or sufficiently small to prevent resolution of the subpixels (or subregions). In Gray Scale Level No. 1, no portion of the pixel is illuminated (i.e., by transmission of light). In Gray Scale Level No. 2, one pixel subregion has light transmitted therethrough. With each successive Gray Scale Level, an additional subpixel region has light transmitted therethrough, until, at Gray Scale Level No. 10, the entire pixel is illuminated by having light transmitted therethrough.

Figure 7:
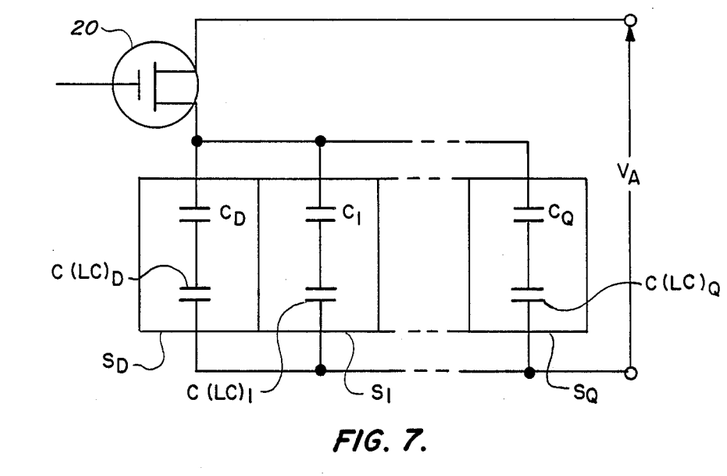
FIG. 7 illustrates the technique for providing gray scale level for a liquid crystal display pixel having a plurality of subpixels.

Referring next to FIG. 7, the technique for providing activation of a selected number of subpixels, the number of subpixels activated determined by the magnitude voltage applied to the pixel is shown. The thin film transistor 20 is coupled to a plurality of subpixels $S_O$ through $S_Q$. Each of the subpixels $S_O$ through $S_Q$ have an effective capacitor $C(LC)_O$ through $C(LC)_Q$, respectively, associated therewith, the liquid crystal material being located between the plates of the effective capacitors and being subjected to the electric field resulting from the charge on the plates of the effective capacitor. In series with each effective subpixel capacitor $C(LC)_O$ through $C(LC)_Q$ is coupled a control capacitor $C_O$ through $C_Q$. When the transistor 20 is placed in the conducting state, the voltage $V_A$ will be applied across each pair of capacitors which are coupled in series. The voltage applied across the liquid crystal for each subpixel well be $V(LC)_Q = V_A \cdot C_Q / [C_Q + C(LC)_Q]$. Therefore, the control capacitor $C^Q$ can determine the voltage applied across the liquid crystal material of each subpixel for a given voltage applied to the pixel.

Figure 8A:
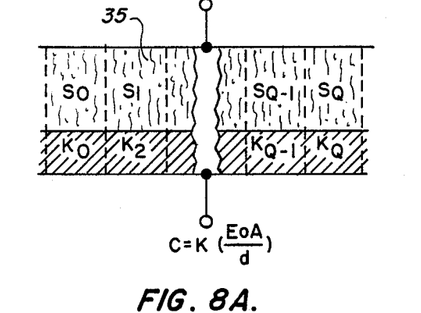
FIG. 8A, 8B and 8C illllustrate techniques for placing a controllable capacitor in series with the effective capacitor of the subpixel.
Figure 8B:
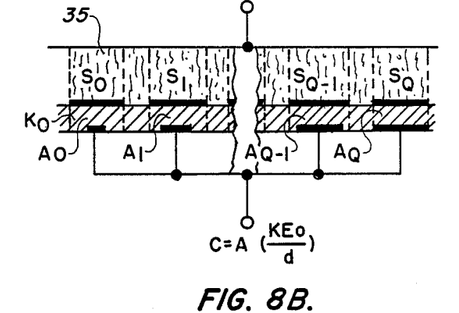
Figure 8C:
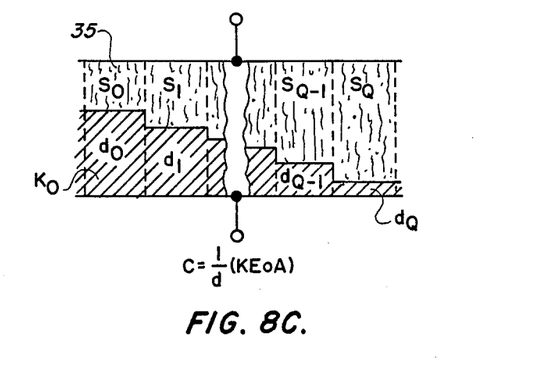

Referring next to FIG. 8A, 8B and 8C, three techniques for fabricating a control capacitor, having a plurality of capacitance values, in series with the effective subpixel capacitor are shown. These techniques are best understood in terms of the plate capacitance equation $C = K e_o A/d$ where k is the relative dielectric constant of the medium, $e_o$ is the dielectric constant of free space, A is the area of the plates of the capacitor and d is the distance between the plates of the capacitor. In FIG. 8A, the capacitance of the control capacitors are controlled by varying the relative dielectric constant k. Thus, the control capacitor of subpixel $S_O$ has ralative dielectric constant $k_O$ associated therewith, the control capacitor of subpixel $S_1$ has relative dielectric constant $k_1$ associated therewith, ect. The result is that capacitance of the control capacitor can be varied for each subpixel. In FIG. 8B, the capacitance of the control capacitance, coupled in series with the effective capacitor of the subpixel across the liquid crystal material, is controlled by adjusting the area of at least one capacitor plate. One plate of the control capacitor associated with subpixel $S_O$ has an area $A_O$, one plate of the control capacitor associated with the subpixel $S_1$ has an area $A_1$, ect. In this manner, the capacitance of the subpixel control capacitor can be varied. In FIG. 8C, the capacitance of the control capacitor is controlled by varying the relative thickness of the dielectric material and the liquid crystal material in the subpixels (thereby controllably varying the electric field applied across the liquid crystal associated with each of the subpixels). The thickness of the dielectric material associated with subpixel $S_O$ is $d_O$, the thickness of the dielectric material associated with subpixel $S_1$ is $d_1$, ect. Therefore, the thickness of the dielectric material associated with each subpixel can control the relative strength of the electric field across the liquid crystal of the associated subpixel. In this technique of control capacitor parameter adjustment, the effective capacitor across the liquid crystal is determined by the thickness of the dielectric material, the dielectric material acting as a control capacitor.

Figure 9:
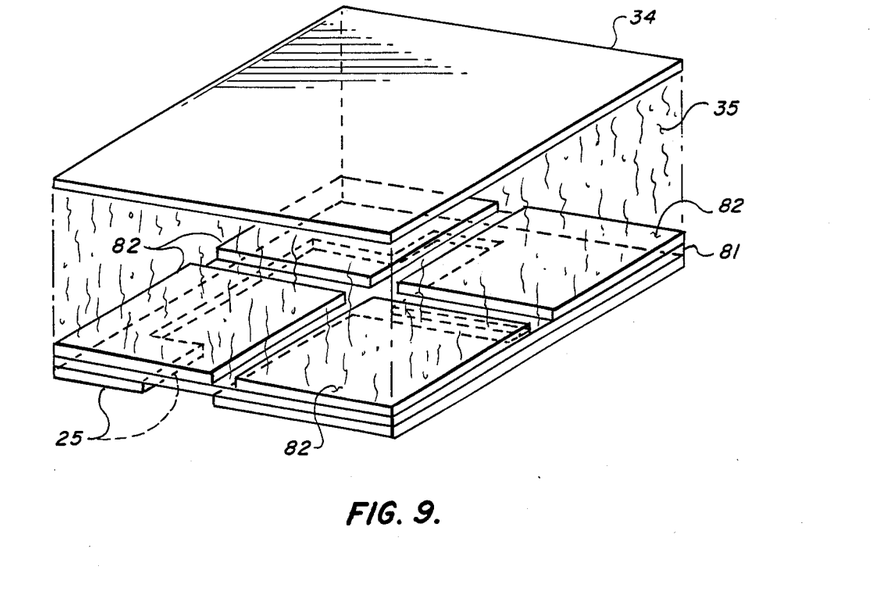
FIG. 9 is an exploded view of a liquid crystal pixel cell using the variable area technique to establish the capacitance of the control capacitor.

Referring next to FIG. 9, an exploded view of an implementation of the variable plate area technique for determining the capacitance of the control capacitor is shown. Common electrode 34 coupled to a substrate (not shown) forms one boundary for liquid crystal 35. The opposite side of the liquid crystal is bounded by common subpixel electrodes 82. The common subpixel electrodes 82 are the electrodes common to the effective liquid crystal capacitor and the control capacitor. The common subpixel electrodes 82 are not coupled to the remainder of the display by conducting elements. The common subpixel electrodes are positioned on dielectric layer 81. On the second side of dielectric layer 81 is the subpixel electrode 25. As will be clear by inspection of the electrode 25, the area of the electrode 25 as seen from each associated common subpixel electrode has a different value for each commonn subpixel electrode. The electrode 25 is positioned on glass plate 29 (in FIG. 3).

Figure 10:
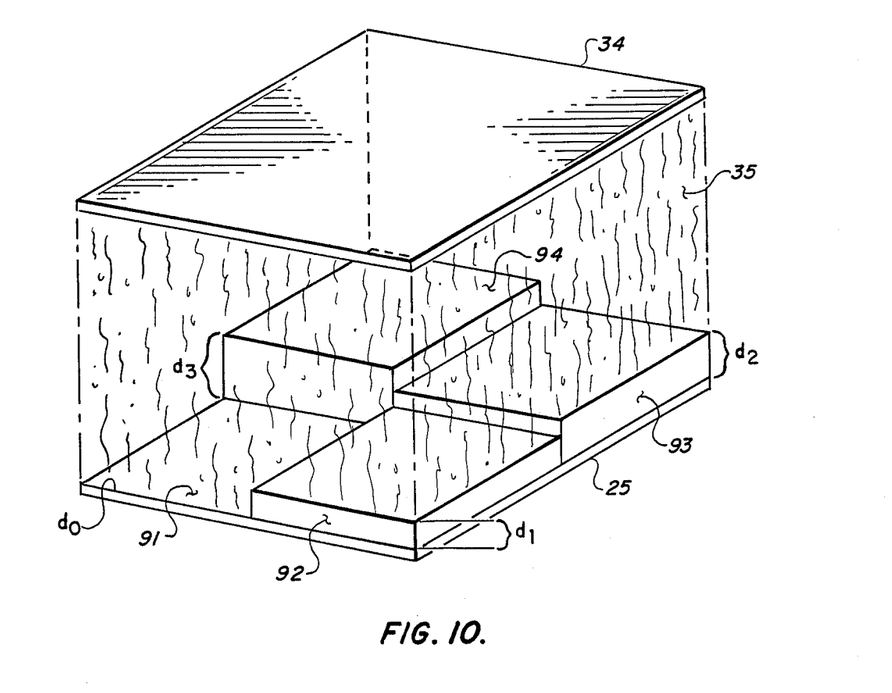
FIG. 10 is a perspecive view of a liquid crystal pixel cell using the dielectric thickness to establish the electric field in an effective capacitor for a subpixel cell.

Referring next to FIG. 10, a perspective view of a liquid crystal pixel cell illustrating the use of variable dielectric thicknesses to determine the voltage across an effective liquid crystal subpixel capacitor is shown. The common pixel electrode forms one boundary of the liquid crystal material 35 of the pixel. A second electrode 25 forms the second boundary of the pixel cell. Associated with the electrode 25 are a plurality of dielectric material regions 91-94, each having associated therewith a thickness $d_0$ through $d_3$ respectively. The voltage between the top of the dielectric regions 91-94 and electrode 34 (and consequently the electric field produced thereby) will be determined by the thickness of the associated dielectric region.

Figure 11:
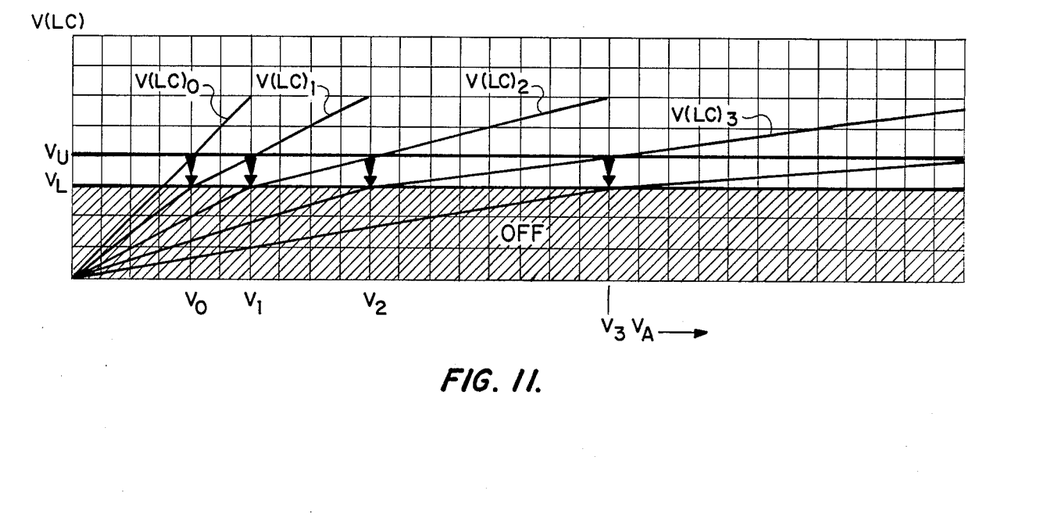
FIG. 11 illustrates the procedure for designing a liquid crystal pixel cell having subpixel activation determined by the applied voltage level.

Referring next to FIG. 11, a procedure for determining subpixel parameters for gray scale capability is illustrated. The ordinate of the graph is the voltage V(LC) across the effective subpixel capacitor. The abscissa is the voltage $V_A$ applied across the pixel cell, the difference being the voltage across the control capacitor. Curves $V(LC)_O$, $V(LC)_1$, $V(LC)_2$ and $V(LC)_3$ are the voltages across effective subpixel capacitors as a function of applied voltage. The voltage level $V_L$ indicates the voltage at which optical activity of the subpixel cell begins while $V_U$ indicates the voltage level at which saturation of the optical activity takes place. Thus, below voltage $V_L$, the subpixel is completely opaque, while above voltage $V_U$, the subpixel is completely transparent. Referring to the $V(LC)_O$ curve, i.e., the voltage across the effective liquid crystal capacitor of subpixel $S_O$ is illustrated the associated subpixel will be transparent when the voltage $V_A = V_O$ is applied across the pixel. The $V(LC)_1$, the voltage across the effective liquid crystal capacitor of subpixel $S_1$, should be at most $V_L$ when $V_A = V_O$. Referring to FIG. 9, this relationship establishes the ratio between the area of electrode 25 associated with subpixel $S_O$ and the area of electrode 25 associated with subpixel $S_1$. Similarly, when the pixel voltage is $V_A = V_1$, the voltage across the effective pixel capacitor $V(LC)_1$ reaches the optical saturation voltage $V_U$, while the voltage $V(CL)_2$ across the effective liquid crystal capacitor of subpixel $S_2$ reaches the liquid crystal threshold voltage $V_L$. This voltage condition determines the ratio of area of the capacitor plate 25 associated with subpixel $S_1$ and the area of the capacitor plate 25 associated with subpixel $S_2$.

Referring once again to FIG. 11, the curves $V(LC)_O$, $V(LC)_1$, $V(LC)_2$ and $V(LC)_3$ are not linear. The nonlinearity is the result of changing orientation of the anisotropic liquid crystal molecules under the influence of the applied electric field and the nonlinearity can be described with reference to FIG. 12.

Figure 12:
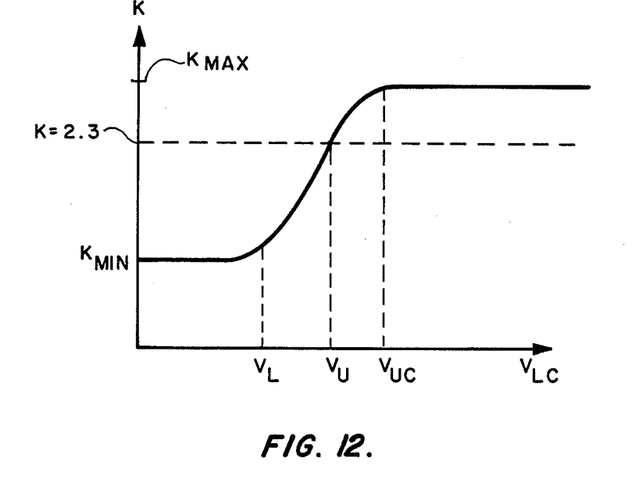
FIG. 12 illustrates a property of liquid crystal materials that effects the structure of the subpixels.

Referring to FIG. 12, the functionality of the dielectric constant for an effective liquid crystal capacitor as a function of applied voltage is illustrated. The relative dielectric constant K has a minimum value that remains essentially constant until the voltage reaches the vincinity of the voltage for optical activation, $V_L$. The relative dielectric constant continues to rise through the voltage level $V_U$ for optical saturation and reaches a maximum value at a voltage level $V_{UC}$ for dielectric saturation. This variation in dielectric constant must be taken into account when establishing the voltage that must be applied to a selected subpixel for optical saturation while the next selected subpixel has the same voltage applied thereto and is near the threshold of optical activity.

2. Operation of the Preferred Embodiment

By using a control capacitor with controllable capacitance in series with each liquid crystal region of a subpixel, the voltage applied to the pixel can determine which of the subpixels can transmit light. The capability to apply a controllable voltage to the pixel, along with the capability to control the optical properties of each subpixel as a function of voltage applied to the pixel, permits the liquid crystal display pixels to provide wide viewing angle gray scale capability, i.e., as a function of applied voltage.

In the present invention, the activation of selected subpixels is controlled by introducing a control capacitor coupled in series with the effective capacitor of the liquid crystal region of the subpixel. The series control capacitor is fabricated to provide a voltage dividing network whereby the associated subpixel is optically activated at a predetermined voltage applied across the pixel. By arranging the control capacitors to provide optical activation of the subpixel liquid crystal at selected pixel voltages, a gray scale capability can be obtained as function of voltage applied to the pixel. The capacitance of the series control capacitor can be varied as a function of capacitor dielectric constant, as a function of capacitor plate spacing and/or as a function of capacitor plate area. In the preferred embodiment, the capacitor plate area technique is utilized, this technique providing the best control of optical and electrical properties while minimizing difficulties in fabrication.

In the preferred embodiment, the transistor controlling the application of voltage to each pixel is fabricated on the substrate using thin film technology. These transistors can be fabricated using amorphous silicon, polysilicon, cadmium selenide, telerium or other suitable material. The liquid crystal material is selected from a suitable twisted nematic material. However, it will be clear that the approach of the present invention can be used for materials that have an optical activation determined as a function of voltage. The substrate can be fabricated from glass, high temperature glass, quartz or other appropriate material.

When the image to be displayed on the liquid crystal display is stored as a group of logic signals, then a digital to analog converter can be used to obtain the appropriate pixel voltage $V_A$.

Although the present invention has been described with respect to steps in voltage applied to the pixel that eliminates non-optically saturated subpixels, it will be clear that the present invention will increase the uniformity of the light transmission over a wide viewing angle in response to the application of analog signals to the pixel elements of the liquid crystal display unit. This improvement is the result of fact that, for a plurality of subpixels, an applied analog signal results in only one subpixel not being in a saturated state. Thus, only one subpixel (of the plurality of subpixels) will have an optical transmission with appreciable angular dependence. Therefore, the angular dependence will be less apparent, being superimposed on an optical transmission without appreciable angular dependence. Similarly, a gray scale pixel element can be created by using the techniques described in the present invention by creating a sequence of subpixels for each pixel that achieve optical saturation at different voltages, but not necessarily having the relationship shown in FIG. 11. When the pixel typically has a plurality of subpixels in a state of optical transmission saturation, the uiformity of the axial optical transmission will be improved.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A flat panel liquid crystal display having a pluarlity of pixel element, each pixel element comprising:
   a first surface having a conducting material applied thereto;
   a second surface having a conducting material applied thereto, said first and said second surface enclosing said pixel element;
   a plurality of subpixel elements, each subpixel element including;
   a first volume proximate said first surface having said liquid crystal contained therein, and
   a second volume between said first volume and said second surface contained therein, said second volume having therein a dielectric material, wherein said second volume determines an electric field applied to said first volume liquid crystal when a voltage is applied to said first surface conducting material and said second surface conducting material, said second volume adapted to provide saturation of optical activity of said first volume liquid crystal for a preselected voltage 2. The liquid crystal display of claim 1 wherein said optical activity saturation for each subpixel element is determined by a dielectric constant of said dielectric material.

3. The liquid crystal pixel display of claim 1 wherein each subpixel element preselected voltage is selected to provide a gray scale for said each pixel element, said gray scale optical properties being generally uniform as function of viewing angle.

4. The liquid crystal display of claim 1 wherein said optical activity saturation voltage for each subpixel element is determined by a thickness of said second volume dielectric material.

5. The liquid crystal display of claim 1 wherein said optical activity saturation for each subpixel element is determined by an area an electrode formed from said second surface conducting material proximate said each subpixel second volume.

6. The liquid crystal display of claim 3 wherein said optical activity saturation for each subpixel element of a pixel element is arranged in a sequence of preselected voltage magnitudes, a subpiexel element reaching optical activity saturation in response to a voltage applied to said pixel element at a voltage wherein a next subpixel element in said sequence has not reached a threshold optical activation voltage.

7. The liquid crystal display of claim 3 wherein each of said subpixel elements of a pixel element reaches an optical activity saturation voltage at a different voltage applied to said subpixel element.

8. The method of implementing a gray scale for a pixel in a liquid crystal display, said method comprising the steps of:
dividing said pixel into an plurality of subpixels;
enclosing each subpixel between a first and a second conducting surface;
dividing each subpixel into a first and a second volume, said first volume proximate said first conducting surface, said second volume proximate said second conducting surface, said first and said second volume sharing a common boundary;
placing a liquid crystal material in said first volume;
fabricating said second volume with a dielectric material; and
applying a voltage to between said first and said second conducting surface, said voltage causing an electric field to be applied to said liquid crystal material, said electric field being determined by subpixel parameters, said subpixel parameters adjusted to provide optical activity saturation of each subpixel for a preselected voltage.

9. The method of implementing a gray scale liquid crystal display pixel of claim 8 further comprising the step of adjusting said parameters wherein liquid crystal material in a first subpixel has optical activity saturat at a pixel voltage which is approximately an optical activity threshold voltage for a second subpixel.

10. The method of implementing a gray scale liquid crystal display pixel of claim 8 comprising the step from the group consisting of: determining a preselected voltage by a step selected from the group of adjusting a dielectric material thickness of said second volume adjusting a conducting area for said second conducting surface while placing a transparent conductor between said first and said second volume, and selecting a dielectric material having a preestablished dielectric constant 11. The method of implementing a gray scale liquid crystal display pixel of claim 10 further including the step of using a twisted nematic liquid crystal material.

12. A liquid crystal display comprising:
a multiplicity of liquid crystal pixels, each of said pixels including;
a plurality of subpixels each of said subpixels having;
a first transparent conductor proximate a first surface of said subpixels,
a second transparent conductor proximate a second surface of said subpixel,
a first volume in contact with said first subpixel surface, said first volume having a liquid crystal material therein,
a second volume in contact with said second subpixel surface said first volume, said second volume having a dielectric material therein, and
voltage mean for applying a voltage to a preselected pixel, said voltage being applied to said first and said second conductors, wherein each subpixel is adapted to apply and electric field resulting optical activity saturation of said subpixel liquid crystal material for a selected voltage.

13. The liquid crystal display of claim 12 wherein said selected voltage is determined by a dielectric constant of said second volume dielectric material.

14. The liquid crystal display of claim 1 2 wherein said selected voltage is determined by a thickness of said second volume.

15. The liquid crystal display of claim 1 2 wherein said selected voltage is determined by an area of said second conductor, said first and said second volume being separated by a transparent conducting plate.

16. The liquid crystal display of claim 1 2 wherein each subpixel has a different selected voltage for providing optical activity saturation for said subpixel liquid crystal material.

17. The liquid crystal display of claim 1 6 wherein a selected voltage for providing optical activity saturation in a first subpixel is generally less than or equal to a voltage for providing optical activity threshold in a second subpixle.

18. The liquid crystal display of claim 1 2 wherein a voltage applied to said pixel by said voltage means is selected from a group of predetermined voltages and proportional to a signal voltage.

19. The liquid crystal display of claim 18 wherein said voltage means includes a thin film transistor coupled to each pixel for applying said voltages therein response to preselected control signals.

20. The liquid crystal display of claim 16 wherein said liquid crystal material is twisted nematic liquid crystal, wherein using optically saturated subpixels inproves the axial uniformity of radiation transmitted therethrough.

* * * * *